May 13, 1941.  W. G. FIRSTENBERGER ET AL  2,241,878
RAKE TEETH MOUNTING
Filed Sept. 21, 1938
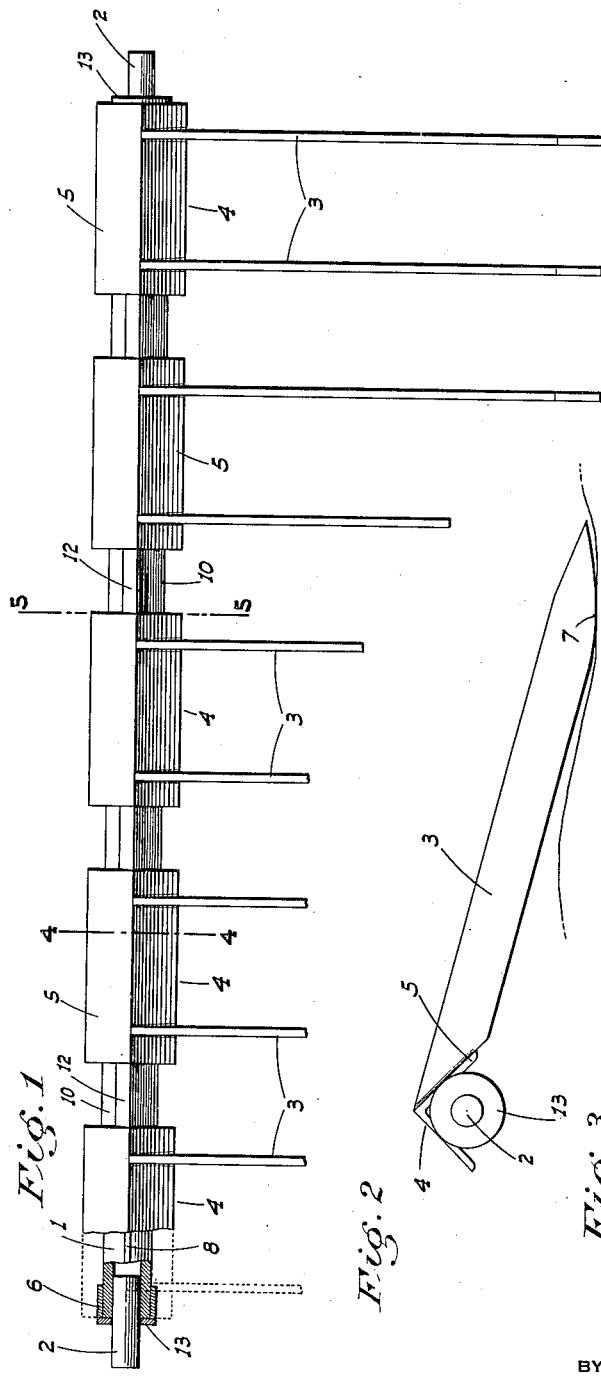
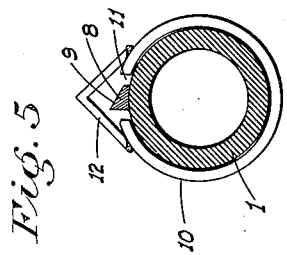
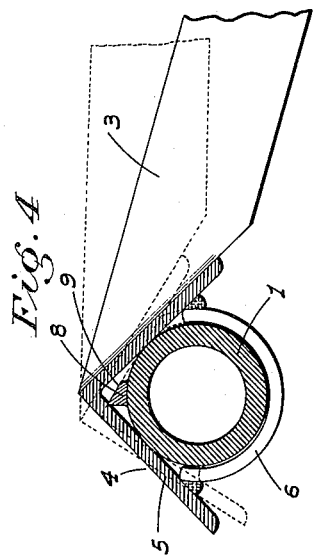
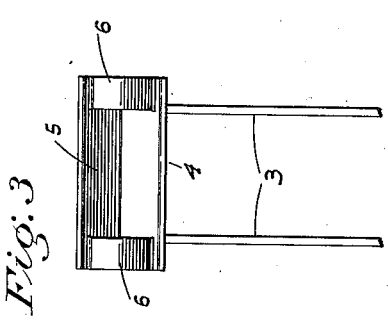
INVENTORS
W. G. Firstenberger
and J. T. Fiese
BY
ATTORNEY Patented May 13, 1941

2,241,878

UNITED STATES PATENT OFFICE 2,241,878

RAKE TEETH MOUNTING

Welcome G. Firstenberger and Jesse T. Fiese, Fresno, Calif.

Application September 21, 1938, Serial No. 230,966

13 Claims. (Cl. 56—400)

This invention relates in general to an agricultural implement and in particular is directed to improvements in rake teeth mountings; the mounting shown in this instance being especially adapted for use in connection with a shredder of the type used on brush, vine cuttings, etc. to mascerate the same.

On such an implement, the rake teeth are mounted on and project forwardly from the front end of the implement; the purpose of such teeth being to pick up the brush, cuttings, or the like from the ground with forward movement of the implement whereby such material may then be fed into the driven mascerating unit.

Heretofore, the rake teeth, which are rigid, have not been flexibly mounted in connection with the implement and, as a result, would skip certain material lying in depressions in the ground, or the teeth would dig into crowns or raised portions of the ground.

It is therefore the principal object of this invention to provide a mounting for rigid rake teeth arranged so that each of the teeth may independently raise or lower in a vertical plane and through a predetermined arc whereby the teeth at their outer or pick-up ends act as a sled and follow the contour of the ground at all times. By reason of such arrangement, a maximum amount of material is picked up from the ground and without the teeth skipping or digging in.

Another object of the invention is to provide an effective stop to prevent undue and unnecessary raising or lowering movement of the teeth beyond predetermined points.

A further object of the invention is to produce a simple and inexpensive device and yet one which will be exceedingly effective for the purpose for which it is designed.

These objects we accomplish by means of such structure and relative arrangement of parts as will fully appear by a perusal of the following specifications and claims.

In the drawing similar characters of reference indicate corresponding parts in the several views:

Figure 1 is a plan view of the assembly partly in section.

Figure 2 is an end view of the assembly.

Figure 3 is a bottom plan view of one of the separate tooth mounting units.

Figure 4 is a cross section, on an enlarged scale, taken on line 4—4 of Fig. 1.

Figure 5 is a cross section, on an enlarged scale, taken on line 5—5 of Fig. 1.

Referring now more particularly to the characters of reference on the drawing, the device comprises a horizontal, tubular shaft 1 having solid stub shafts 2 mounted in and projecting beyond both ends thereof; the shafts 2 being adapted to be journaled in bearing boxes (not shown) on the forward end of the implement frame.

Rake teeth 3, which comprise flat metal bars disposed edgewise, project forwardly from shaft 1; such teeth being fixed in pairs on mounting units, shown generally at 4, which engage on and are spaced lengthwise of shaft 1. Each such unit comprises a section 5 of relatively heavy angle iron having a pair of semi-circular straps 6 welded between the inside faces of the section 5 in spaced relation as shown.

These units 4 engage the shaft 1 snugly but in turning relation thereon; each pair of the teeth 3 being welded on one outer face of and projecting from an angle iron section. The teeth are mounted on the sections 5 so as to slope downward therefrom for engagement with the ground. The lower edge of each tooth at its free end is rounded, as at 7, and thus each tooth acts as a sled and readily passes or slides over the ground.

In order to prevent rocking of the units 4 on shaft 1 through too great an arc, a continuous key 8 is fixed longitudinally on the top of such shaft and extends through the substantially triangular space in the units between the shaft and angle iron sections. This key is cut with a bevel 9 which faces forward so that the teeth may swing through the desired arc before the key blocks their movement.

The units 4 are held in spaced relation on shaft 1 by means of longitudinally split collars 10 which surround the shaft; the continuous key extending through the collar slots 11 and relatively small angle iron sections 12 bridge over the slots and the key and are welded on such collars. Washers 13 on shaft 1 engage between the end units 4 and the bearing boxes to prevent binding.

From the foregoing description it will be readily seen that we have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described our invention, what we claim as new and useful and desire to secure by Letters Patent is:

1. In combination, a horizontal shaft, a plurality of rake teeth supporting units rotatably mounted on said shaft, each unit comprising a section of angle iron and a substantially semicircular strap secured between the inner faces of the section, the shaft extending through the unit between the section and strap in relatively turnable relation; and a plurality of rigid rake teeth fixed on said units and projecting forwardly of the shaft.

2. A device as in claim 1 including a continuous, longitudinal stop key fixed on the shaft and of radial height to extend with clearance into the hollow spaces between the shaft and converging inner faces of the sections whereby to engage one or the other of said faces and limit rotation of the units about the shaft.

3. A device as in claim 1 including spacer members on the shaft between said units; said spacers including collars which engage the semi-circular straps of the units in end to end relation.

4. In combination, a horizontal shaft, a plurality of rake teeth supporting units rotatably mounted on said shaft, each unit comprising a section of angle iron and a substantially semicircular strap secured between the inner faces of the section, the shaft extending through the unit between the section and strap in relatively turnable relation; a plurality of rigid rake teeth fixed at one end on the outer faces of the angle iron sections and projecting radially of the shaft, a continuous longitudinal stop key fixed on the shaft and of a radial height to extend into the hollow spaces between the shaft and converging inner faces of the sections whereby to engage one or the other of said faces and limit rotation of the units about the shaft, a plurality of spacer collars engaged about the shaft intermediate the units, said collars being slotted lengthwise to receive the continuous key, and other sections of angle iron secured on said collars and bridging over the slots and the key.

5. In combination, a horizontal shaft, a plurality of rake-teeth supporting units independently and turnably mounted on the shaft, teeth projecting from and fixed on the individual units, each unit comprising a segmental strap turnably engaging the shaft and an element connected to and bridging over the gap formed between the ends of the segment, and an element fixed on the shaft narrower than and projecting into said gap.

6. A structure as in claim 5 with spacer members on the shaft between the units and including collars engaging the straps of the units.

7. In combination, a horizontal shaft, a plurality of rake-teeth supporting units independently and turnably mounted on the shaft, teeth projecting from and fixed on the individual units, each unit comprising a segmental strap turnably engaging the shaft and an element connected to and bridging over the gap formed between the ends of the segment, and a continuous key extending along the shaft, said key being narrower than said gap and projecting into the gaps of all the teeth supporting units.

8. In combination, a horizontal shaft, a plurality of rake-teeth supporting units independently and turnably mounted on the shaft, each unit comprising a pair of strap elements spaced lengthwise of and turnably engaging the shaft, a member connecting said elements and a pair of spaced teeth rigid with and projecting from said member; and means limiting the rotation of the units on the shaft.

9. In combination, a horizontal shaft, a plurality of rake-teeth supporting units rotatably mounted on said shaft, each unit comprising a section of angle iron and a substantially semicircular strap secured between the inner faces of the section, the shaft extending through the unit between the section and strap in relatively turnable relation, and a rigid rake tooth of flat bar form set on edge and at one end cut to engage and abut against the forward face of the angle section of each unit for substantially the full height of said section and rigidly secured thereon.

10. In the combination of a horizontal shaft, a plurality of rake teeth supporting units independently and rotatably mounted on the shaft, and rake teeth fixed on and projecting from said units; each such unit including a member surrounding the shaft and having a longitudinally extending cavity therein open to the shaft and to the ends of said member, and a continuous stop element fixed lengthwise on the shaft and projecting substantially radially into said cavities, said stop element being substantially narrower than said cavities.

11. In the combination of a horizontal shaft, a rake tooth supporting unit rotatably mounted on said shaft, and a rake tooth fixed on said unit and projecting therefrom; said unit comprising a section of angle iron engaging the shaft, and a member secured on said section transversely and bridging the initial open side thereof, the shaft extending through said unit between the section and member in relatively turnable relation, and a stop element fixed on the shaft and projecting into the substantially triangular internal cavity, formed between the shaft and said section, in loose play relation circumferentially of the shaft.

12. In combination, a horizontal shaft, means mounting the shaft for unrestrained rotation, a rake-tooth supporting unit turnably mounted on the shaft, a rake-tooth fixed on and projecting from the unit and cooperating elements on the unit and shaft to limit relative rotation thereof to an arc of predetermined length.

13. In the combination of a horizontal shaft, a rake-tooth supporting unit mounted on the shaft and a rake-tooth fixed on and projecting from the unit; said unit including a member surrounding and turnable on the shaft and formed with a circumferentially extending cavity open to said shaft and a stop element fixed on the shaft and projecting into the cavity, the circumferential extent of the element being substantially less than that of the cavity.

WELCOME G. FIRSTENBERGER.
JESSE T. FIESE.